United States Patent
Brothers et al.

(10) Patent No.: US 6,660,078 B2
(45) Date of Patent: Dec. 9, 2003

(54) METHODS, WELL CEMENT COMPOSITIONS AND LIGHTWEIGHT ADDITIVES THEREFOR

(75) Inventors: Lance E. Brothers, Chickasha, OK (US); Krista L. Keener, Duncan, OK (US); James A. Braden, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/301,060

(22) Filed: Nov. 20, 2002

(65) Prior Publication Data

US 2003/0101914 A1 Jun. 5, 2003

Related U.S. Application Data

(62) Division of application No. 10/005,266, filed on Dec. 3, 2001.

(51) Int. Cl.⁷ .............................................. C04B 18/08
(52) U.S. Cl. ..................... 106/705; 106/706; 106/718; 106/DIG. 1; 106/DIG. 4
(58) Field of Search .................. 106/705, 706, 106/718, DIG. 1, DIG. 4

(56) References Cited

U.S. PATENT DOCUMENTS

| | | | |
|---|---|---|---|
| 3,902,911 A | 9/1975 | Messenger .................. | 106/97 |
| 4,234,344 A | 11/1980 | Tinsely et al. ................ | 106/88 |
| 4,370,166 A | 1/1983 | Powers et al. ................ | 106/97 |
| 4,618,376 A | 10/1986 | Saternus et al. .............. | 134/26 |
| 6,152,227 A | * 11/2000 | Lawson et al. .............. | 166/293 |
| 6,173,778 B1 | 1/2001 | Rae et al. ................... | 166/293 |
| 6,196,316 B1 | 3/2001 | Bosma et al. ............... | 166/294 |
| 6,258,160 B1 | 7/2001 | Chatterji et al. ............ | 106/705 |

FOREIGN PATENT DOCUMENTS

| | | | |
|---|---|---|---|
| CN | 1109089 | * | 9/1995 |
| CN | 1115324 | * | 1/1996 |
| DE | 19725761 | * | 12/1998 |
| JP | 07331993 | * | 12/1995 |
| JP | 2002193701 | * | 7/2002 |
| NO | 167649 | | 7/1963 |
| WO | WO 90/11977 | | 10/1990 |

OTHER PUBLICATIONS

Halliburton brochure entitled "Spherelite Cement Additive" dated 1999.

Paper entitled "Cementing" by Dwight K. Smith, pp. 21–27, 1990.

* cited by examiner

*Primary Examiner*—Paul Marcantoni
(74) *Attorney, Agent, or Firm*—Craig W. Roddy; C. Clark Dougherty, Jr.

(57) ABSTRACT

The present invention provides methods, lightweight well cement compositions and additives for the well cement compositions. The methods of the invention for sealing pipe in a well bore penetrating a zone or formation which readily fractures at low hydrostatic pressure is basically comprised of the steps of providing a lightweight cement composition comprised of a hydraulic cement, water and an additive comprising a suspension of microspheres in water gelled with sodium bentonite, placing the cement composition in the annulus between the pipe and the well bore and allowing the cement composition to set.

19 Claims, No Drawings

METHODS, WELL CEMENT COMPOSITIONS AND LIGHTWEIGHT ADDITIVES THEREFOR

CROSS-REFERENCE TO RELATED APPLICATION

This is a Divisional of co-pending application Ser. No. 10/005,266 filed on Dec. 3, 2001.

BACKGROUND OF THE INVENTION

1. Field of the Invention

The present invention relates to methods, compositions and lightweight additives for sealing pipe strings in well bores, and more particularly, to such methods, compositions and additives wherein the well bores penetrate formations that readily fracture at low hydrostatic pressures.

2. Description of the Prior Art

Hydraulic cement compositions are commonly utilized in oil, gas and water well completion and remedial operations. For example, hydraulic cement compositions are used in primary cementing operations whereby strings of pipe such as casing and liners are cemented in well bores. In performing primary cementing, a hydraulic cement composition is pumped into the annular space between the walls of a well bore and the exterior of a string of pipe disposed therein. The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In some well locations, the subterranean zones or formations into or through which wells are drilled have high permeabilities and low compressive and tensile strengths. As a result, the resistance of the zones or formations to shear are low and they have low fracture gradients. When a hydraulic cement composition is introduced into a well bore penetrating such a subterranean zone or formation, the hydrostatic pressure exerted on the walls of the well bore can exceed the fracture gradient of the zone or formation and cause fractures to be formed in the zone or formation into which the cement composition is lost. While lightweight cement compositions have been developed and used, subterranean zones or formations are often encountered which have fracture gradients too low for the lightweight cement compositions to be utilized without the formation of fractures and the occurrence of lost circulation problems.

Thus, there are needs for improved lightweight cement compositions for sealing pipe such as casings and liners in well bores which penetrate zones or formations having very low fracture gradients.

SUMMARY OF THE INVENTION

The present invention provides lightweight well cement compositions, additives for use in the compositions and methods of using the lightweight compositions for sealing pipe in well bores penetrating zones or formations having low fracture gradients which meet the needs described above and overcome the deficiencies of the prior art. The methods of this invention basically comprise the steps of providing a lightweight cement composition comprised of a hydraulic cement, water and an additive comprising a suspension of microspheres in water gelled with sodium bentonite. The cement composition is placed into the annulus between a pipe and the walls of a well bore and the sealing composition is allowed to set into a hard impermeable mass.

A lightweight sealing composition of this invention is basically comprised of a hydraulic cement, water and an additive for making the cement composition lightweight. The additive utilized in accordance with this invention is comprised of a suspension of microspheres in water gelled with sodium bentonite.

It is, therefore, a general object of the present invention to provide methods, lightweight well cement compositions and additives for use in cementing pipe in well bores.

Other and further objects, features and advantages of the present invention will be readily apparent to those skilled in the art upon a reading of the description of preferred embodiments which follows.

DESCRIPTION OF PREFERRED EMBODIMENTS

By the present invention, methods, lightweight well cement compositions and additives therefor are provided for sealing pipes in well bores penetrating zones or formations which readily fracture at low hydrostatic pressures. The methods of this invention for sealing a pipe in a well bore penetrating a zone or formation which readily fractures at low hydrostatic pressures is basically comprised of providing a lightweight cement composition comprised of a hydraulic cement, water and an additive comprising a suspension of microspheres in water gelled with sodium bentonite. The lightweight cement composition is placed into the annulus between the exterior surfaces of the pipe and the walls of the well bore and the cement composition is allowed to set into a hard impermeable mass therein.

A variety of hydraulic cements can be utilized in accordance with the present invention including those comprised of calcium, aluminum, silicon, oxygen and/or sulfur which set and harden by reaction with water. Such hydraulic cements include Portland cements, slag cements, pozzolana cements, gypsum cements, aluminous cements and silica cements. Portland cements or their equivalents are generally preferred for use in accordance with the present invention. Portland cements of the types defined and described in the *API Specification For Materials And Testing For Well Cement*, API Specification 10, $5^{th}$ Edition, dated Jul. 1, 1990 of the American Petroleum Institute are particularly suitable. Preferred API Portland cements include Classes A, B, C, G and H with Classes G and H being more preferred, and Class G being the most preferred.

The water utilized to form the foamed cement compositions of this invention can be fresh water, unsaturated salt solutions or saturated salt solutions. The water is included in the cement compositions of this invention in an amount in the range of from about 60% to about 250% by weight of hydraulic cement therein.

The additive which is included in the cement compositions of this invention to make the compositions lightweight is basically comprised of a suspension of microspheres in water gelled with sodium bentonite. While various microspheres can be utilized, fly ash microspheres are preferred for use in the present invention. Particularly suitable such fly ash microspheres are commercially available from Halliburton Energy Services, Inc. of Duncan, Okla. under the tradename "SPHERELITE™". Another type of microspheres that can be used is synthetic hollow glass microspheres commercially available from Minnesota Mining and Manufacturing Company (3M™) under the tradename "SCOTCHLITE™". These very low density microspheres are formed of a chemically stable soda-lime borosilicate glass composition which is nonporous. The microspheres used are included in the water gelled with sodium bentonite in a general amount in the range of from about 30% to about 100% by weight of the water. Preferably, the microspheres are included in the gelled water in an amount of about 67% by weight of the water therein. The sodium bentonite hydrates in the water and forms a stable gel in which the microspheres do not float. The sodium bentonite is included in the water in an amount in the range of from about 1% to about 4% by weight of the water, preferably an amount of about 2% by weight of the water.

As will be understood by those skilled in the art, various conventional additives can be included in the lightweight sealing compositions of this invention including, but not limited to, set retarders, set accelerators, fluid loss control additives and dispersants.

A preferred method of this invention for sealing pipe in a well bore penetrating a zone or formation which readily fractures at low hydrostatic pressures is comprised of the steps of: (a) providing a lightweight cement composition comprised of a hydraulic cement, water and an additive comprising a suspension of microspheres in water gelled with sodium bentonite; (b) placing the cement composition between the exterior surfaces of the pipe and the walls of the well bore; and (c) allowing the cement composition to set into a hard impermeable mass.

A more preferred method of the present invention for sealing pipe in a well bore penetrating a zone or formation which readily fractures at low hydrostatic pressures is comprised of the steps of: (a) providing a lightweight cement composition comprised of a hydraulic cement, water present in the composition in an amount in the range of from about 60% to about 250% by weight of the hydraulic cement therein and an additive comprising a suspension of fly ash microspheres in water gelled with sodium bentonite present in the composition in an amount in the range of from about 30% to about 100% by weight of hydraulic cement therein; (b) placing the cement composition into the annulus between the pipe and the walls of the well bore; and (c) allowing the cement composition to set into a hard impermeable mass.

A preferred lightweight well cement composition of this invention is comprised of: a hydraulic cement; water selected from the group of fresh water, unsaturated salt solutions and saturated salt solutions present in an amount in the range of from about 60% to about 250% by weight of the hydraulic cement in the composition; and an additive comprised of a suspension of microspheres in water gelled with sodium bentonite present in an amount in the range of from about 30% to about 100% by weight of hydraulic cement in the composition.

A preferred lightweight cement composition additive of this invention is comprised of: a suspension of microspheres in water gelled with sodium bentonite.

A more preferred lightweight cement composition additive of this invention is comprised of: a suspension of fly ash microspheres in water gelled with sodium bentonite, the fly ash microspheres being present in an amount in the range of from about 30% to about 48% by weight of the additive; the sodium bentonite being present in an amount in the range of from about 1% to about 2% by weight of the additive; and the water being present in an amount in the range of from about 50% to about 69% by weight of the additive.

The most preferred lightweight cement composition additive of this invention is comprised of: a suspension of fly ash microspheres in a water solution of sodium bentonite, the microspheres being present in an amount of about 40% by weight of the additive; the sodium bentonite being present in an amount of about 1.2% by weight of the additive; and the water being present in an amount of about 58.8% by weight of the additive.

In order to further illustrate the methods, the lightweight well cement compositions and the additives of this present invention, the following examples are given.

EXAMPLE

A lightweight additive of this invention was prepared by hydrating 20 grams of sodium bentonite in 1000 grams of water. To 600 grams of the resulting water gelled with sodium bentonite, 400 grams of fly ash microspheres were added. 300 grams of Portland cement were then mixed with 300 grams of the lightweight additive and 150 grams of fresh water. The resulting cement slurry was subjected to 4000 psi of pressure to simulate the hydraulic pressure at the bottom of a well bore. After being subjected to the applied pressure, the density of the slurry was 11.2 lb/gal. The slurry was poured into a plexiglass tube measuring 12 inches in length and 1.75 inches internal diameter. The slurry was then allowed to set to form a hardened mass after which a one inch section was cut from the top and bottom of the plexiglass tube. The hardened cement was removed from the one inch sections of the tube and their densities determined. The density of the bottom section was 11.1 lb/gal and the density of the top section was 11.3 lb/gal. This shows that, within experimental error, the cement was uniform in density and the experimental liquid additive was effective in preparing a lightweight cement.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition additive comprising a suspension of fly ash microspheres in a water solution of sodium bentonite.

2. The additive of claim 1 wherein said micro spheres are present in an amount in the range of from about 30% to about 48% by weight of said additive.

3. The additive of claim 1 wherein said sodium bentonite is present in an amount in the range of from about 1% to about 2% by weight of said additive.

4. The additive of claim 1 wherein said water is selected from the group consisting of fresh water, unsaturated salt solutions and saturated salt solutions.

5. The additive of claim 1 wherein said water is present in an amount in the range of from about 50% to about 69% by weight of said additive.

6. The additive of claim 1 wherein said microspheres are present in an amount of about 40% by weight of said additive.

7. The additive of claim 1 wherein said sodium bentonite is present in an amount of about 1.2% by weight of said additive.

8. The additive of claim 1 wherein said water is present in an amount of about 58.8% by weight of said additive.

9. A cement composition additive comprising a suspension of fly ash microspheres in a water solution of sodium bentonite, wherein said microspheres are present in an amount in the range of from about 30% to about 48% by weight of said additive and said sodium bentonite is present in an amount in the range of from about 1% to about 2% by weight of said additive.

10. The additive of claim 9 wherein said water is selected from the group consisting of fresh water, unsaturated salt solutions and saturated salt solutions.

11. The additive of claim 9 wherein said water is present in an amount in the range of from about 50% to about 69% by weight of said additive.

12. The additive of claim 9 wherein said microspheres are present in an amount of about 40% by weight of said additive.

13. The additive of claim 9 wherein said sodium bentonite is present in an amount of about 1.2% by weight of said additive.

14. The additive of claim 9 wherein said water is present in an amount of about 58.8% by weight of said additive.

15. A cement composition additive comprising a suspension of fly ash microspheres in a water solution of sodium bentonite, wherein said microspheres are present in an amount in the range of from about 30% to about 48% by weight of said additive, said water is present in an amount in the range of from about 50% to about 69% by weight of said additive and said sodium bentonite is present in an amount in the range of from about 1% to about 2% by weight of said additive.

16. The additive of claim 15 wherein said water is selected from the group consisting of fresh water, unsaturated salt solutions and saturated salt solutions.

17. The additive of claim 15 wherein said micro spheres are present in an amount of about 40% by weight of said additive.

18. The additive of claim 15 wherein said sodium bentonite is present in an amount of about 1.2% by weight of said additive.

19. The additive of claim 15 wherein said water is present in an amount of about 58.8% by weight of said additive.

* * * * *